(12) United States Patent
Catalano et al.

(10) Patent No.: US 8,185,934 B2
(45) Date of Patent: May 22, 2012

(54) PROGRAMMABLE DATA PROTECTION DEVICE, SECURE PROGRAMMING MANAGER SYSTEM AND PROCESS FOR CONTROLLING ACCESS TO AN INTERCONNECT NETWORK FOR AN INTEGRATED CIRCUIT

(75) Inventors: Valerio Catalano, Meylan (FR); Marcello Coppola, Sassenage (FR); Riccardo Locatelli, Grenoble (FR); Cristina Silvano, Milan (IT); Gianluca Palermo, Vimodrone (IT); Leandro Fiorin, Lugano (CH)

(73) Assignee: STMicroelectronics (Grenoble) SAS, Grenoble (FR)

( * ) Notice: Subject to any disclaimer, the term of this patent is extended or adjusted under 35 U.S.C. 154(b) by 921 days.

(21) Appl. No.: 12/207,131

(22) Filed: Sep. 9, 2008

(65) Prior Publication Data

US 2009/0089861 A1 Apr. 2, 2009

(30) Foreign Application Priority Data

Sep. 28, 2007 (EP) .................................... 07301411

(51) Int. Cl.
*H04L 9/32* (2006.01)
(52) U.S. Cl. ..................................... 726/2; 726/3; 726/4
(58) Field of Classification Search .................. 713/189, 713/193–194; 726/2–3, 26–27; 709/214–216, 709/223–225, 229; 711/100
See application file for complete search history.

(56) References Cited

U.S. PATENT DOCUMENTS 6,983,382 B1 * 1/2006 Hartke et al. ..................... 726/4
6,985,483 B2 * 1/2006 Mehrotra et al. ............. 370/389

FOREIGN PATENT DOCUMENTS

WO WO-2006089560 8/2006

OTHER PUBLICATIONS

Armin Wasicek and Wilfried Elmenreich, Internet Firewalls in the DECOS System-on-a-Chip Architecture, 2007, IEEE, pp. 983-988.
Suhyung Jo and Kiyoung Kim, A Study of Security Policy Enforcement using Priority, SICE-ICASE International Joint Conference 2006, Oct. 18-21, 2006 in Bexco, Busan, Korea, pp. 3726-3729.
Jorg-Christian Niemann, Christoph Puttmann, Mario Porrmann, Ulrich Ruckert, Resource efficiency of the GigaNetIC chip multiprocessor architecture, Journal of Systems Architecture 53 (2007) 285-299.
Partial European Search Report, EP 07 30 1411, Jun. 9, 2008, 2 Pages.

* cited by examiner

*Primary Examiner* — Hosuk Song
(74) *Attorney, Agent, or Firm* — Gardere Wynne Sewell LLP

(57) ABSTRACT

A data protection device for an interconnect network on chip (NoC) includes a header encoder that receives input requests for generating network packets. The encoder routes the input requests to a destination address. An access control unit controls and allows access to the destination address. The access control unit uses a memory to store access rules for controlling access to the network as a function of the destination address and of a source of the input request.

21 Claims, 4 Drawing Sheets

Protected Memory Zones

Groups

PROGRAMMABLE DATA PROTECTION DEVICE, SECURE PROGRAMMING MANAGER SYSTEM AND PROCESS FOR CONTROLLING ACCESS TO AN INTERCONNECT NETWORK FOR AN INTEGRATED CIRCUIT

PRIORITY CLAIM

The present application is a translation of and claims priority from European Application for Patent No. 07301411.0 of the same title filed Sep. 28, 2007, the disclosure of which is hereby incorporated by reference.

BACKGROUND OF THE INVENTION

1. Technical Field of the Invention

The present invention relates to data protection for embedded devices in integrated circuits. More particularly, the invention deals with security in so-called Network-on-Chips (NoC) circuits.

2. Description of Related Art

In the field of integrated circuits, the level of integration that silicon technology has reached allows the use of advanced design processes for enabling applications that were to date infeasible.

The number of cores per die and the complexity of interactions among them have been increased accordingly. The complexity of new systems spawns the challenge of enabling reliable communication channels between cores. This challenge becomes more and more difficult as the number of integrated cores per design increases.

To increase the level of integration as well as the reliability of communication, the so-called Network-on-Chip (NoC) approach has been proposed to connect and manage a communication between a variety of embedded elements as well as to manage communication between the integrated circuit and outside blocks.

Similar to networked computers, a NoC provides an efficient means to manage communications among any collection of distributed systems, which, for complex systems on a chip (SoCs), incorporating for example several NoCs, can be individual blocks and/or clusters of functionalities that must all communicate with each other.

Although the use of such a complex communication infrastructure provides many advantages, security in such a system is one of the main issues to be considered.

In the state of the art, one approach to provide security in NoCs was based on an exchange of cryptographic keys within the NoCs, addressing in particular the protection from power and/or electromagnetic attacks of a system containing not secure cores as well as secure ones.

According to another approach, it has been proposed to use low and high security virtual channels to transmit information in a secure area, giving higher priority to information flowing in the high security virtual channels.

According to a further approach, a firewall connected to the Network on-Chip has been used to protect the system integrity and the media content transmitted between On-Chip processing blocks and various inputs and outputs as well as between On-Chip processing blocks and memory sub-systems.

SUMMARY OF THE INVENTION

In view of the foregoing, it is hereby proposed, according to one approach, a data protection device for an interconnection network (NoC), comprising: an header encoder receiving input requests for generating network packets for routing the requests to the destination address; and an access control unit for allowing access to said destination address, said access control unit comprising memory means for storing access rules for controlling access to said network as a function of the destination address and of a source of said request.

According to another feature, the access control unit comprises a security address decoder comprising memory means in which are stored a set of memory regions each associated with global access modality data.

According to a further feature of the data protection device, said access control unit may comprise a request source decoder comprising memory means in which are stored a set of groups of transaction sources, such as processor threads or sub-processes.

According to yet another feature, said access control unit comprises a security access controller comprising memory means in which are stored access right data for each group of transaction sources, each associated with a memory region data indicating the regions in which the access right data are valid.

In one embodiment, the data protection device may further comprise an access mode checker comprising means for controlling matching between the global access modality data for one selected memory region with access modality provided in said request.

It may further comprise means for encoding a packet header to route the request to the destination address generated by the address decoder under the control of said access control unit.

According to another approach, since the data protection device is re-programmable it is in addition proposed a secure programming manager system for controlling programming access to an interconnection network through a programming port, comprising an access control unit for allowing programming access at a destination address, said access control unit comprising memory means for storing access rules for controlling programming access to said network as a function of the destination address and of a source of a programming request.

According to another feature, the secure programming manager system comprises in addition means for generating a first reply signal to the transaction source and means for controlling receipt of a second reply signal from the transaction source within a time limit.

For example, the first signal is a random signal.

The first signal may also be formed by a cryptographic key signal.

According to yet another approach, it is in addition proposed a process for controlling access to a network in an integrated circuit, said process comprising the steps of: receiving an input request from at least one transaction source, said request containing at least one requested address data and transaction source data, such as processor, threads or sub-processes; reading access rules in memory means for said requested address data and transaction source data; and allowing access to said network at said requested address as a function of said access rules.

In one embodiment, this process may further comprise the step of identifying a memory region corresponding to said requested address data associated with global access modality data.

It may further comprise the step of identifying a group of transaction sources corresponding to said transaction source data.

In one embodiment, the process may comprise in addition the step of obtaining access right data corresponding to said group of transaction sources and checking whether access right data are valid for said memory region.

It may further comprise the step of controlling matching between the global access modality data and access modality provided in said request.

According to yet another feature, this process may in addition comprise the step of controlling whether the requested address size exceeds the size of said memory region.

In an embodiment, a data protection device for an interconnection network on chip comprises an access control unit at a network interface positioned between a network on chip and a communication element on chip which initiates a request to access the network on chip, that request being received by the network interface. The access control unit comprises: a security address decoder which determines whether a destination address of the received request falls within a certain protected memory zone, and if so outputs data indicative of the certain protected memory zone and of possible uses of the certain protected memory zone; a mode checker which determines whether attribute data associated with the received request matches the data indicative of possible uses of the certain protected memory zone and generate a first signal indicative thereof; a source decoder which determines a source of the received request; a rule checker responsive to the identified source and the certain protected memory zone which determines whether the source is permitted to access the protected memory zone and generate a second signal indicative thereof; and a circuit for combining the first and second signals to generate a control signal indicative of permission for the received request to access the network on chip.

In another embodiment, a data protection device for an interconnection network on chip comprises: an access control unit at a network interface positioned between a network on chip and a communication element on chip which initiates a request to access the network on chip, that request being received by the network interface. The access control unit comprises: means for checking whether a destination address specified in the request is falls within a certain protected memory zone; means for checking whether source of the request is authorized to access the network on chip in the certain protected memory zone; and means for checking whether requested operation associated with the request is permitted for certain protected memory zone.

BRIEF DESCRIPTION OF THE DRAWINGS

Other features of advantages will become apparent from the following description, given only by way of example and in view of the following drawings, in which.

DETAILED DESCRIPTION OF THE DRAWINGS

Figure 1:
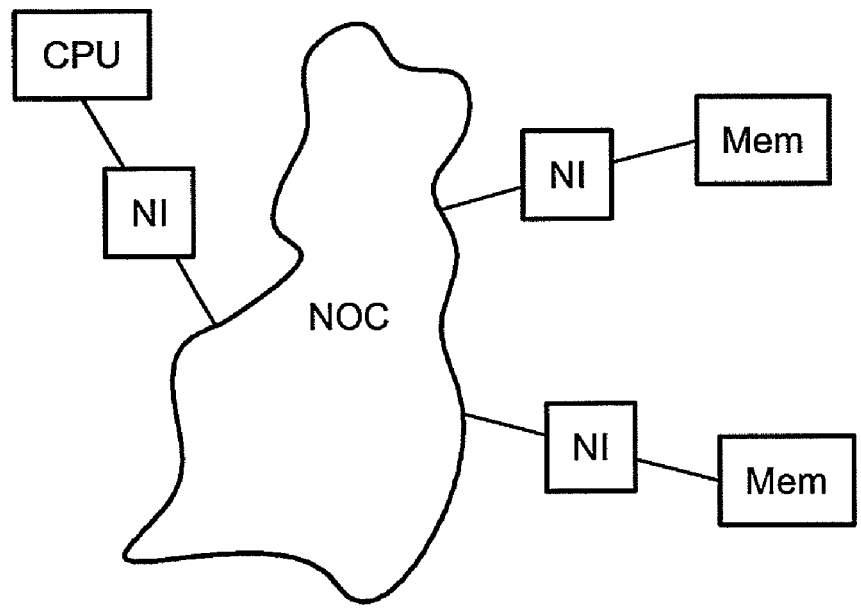
FIG. 1 illustrates the general context of the data protection device.

Reference is made to FIG. 1, showing overview of a NoC used to connect together communicating elements.

NoC is an interconnection network providing efficient means to manage communication among the communicating elements and permits in addition to provide access to said elements from outside elements, such as a Central Possessing Unit (CPU), a Memory (Mem), subsystems, and the like.

As illustrated, access to the NoC is made through network interfaces NI which support security for the communication system, by filtering requests to access the network at requested address.

The network interface provides an On-Chip programmable security "firewall" which is employed to protect the system integrity and the media content passed between On-Chip processing blocks, various inputs and/or outputs and a memory sub-system.

When an initiator of an access request tries to access to an address at a secured zone without having the right to access to it, the network interface generates a security violation signal. As it will be indicated below, each request, before being forwarded to a target through the Network-On-Chip, is inspected and must pass several security checks.

First of all, it must be checked whether the address specified in the request is present in a register containing a list of the protected memory zones.

In addition, it must be checked whether the initiator of the request is authorized to access the requested address.

It must also be checked whether the initiator has the correct access rights for accessing the requested address, and for the requested operation.

Figure 2:
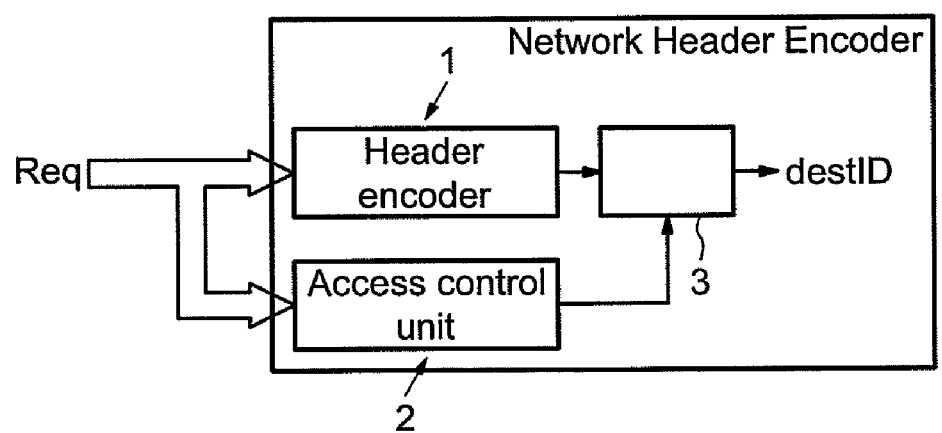
FIG. 2 illustrates the overall structure of a data protection device.

Referring now to FIG. 2, the data protection device of the network interface comprises a header encoder 1 receiving input requests Req and used to generate the network packet from requested address data transmitted in the request Req. It is intended to generate a header for routing request packets to the requested address, according to the protocol packet transmitted through the NoC, and as a function of detecting security violations.

The data protection device comprises in addition an access control unit 2 used to filter the requests and to verify that the incoming request is compatible with a set of filtering rules.

It further comprises an access selector 3 used to allow the packet forwarding according to the result of the security control realized by the access control unit.

Figure 3:
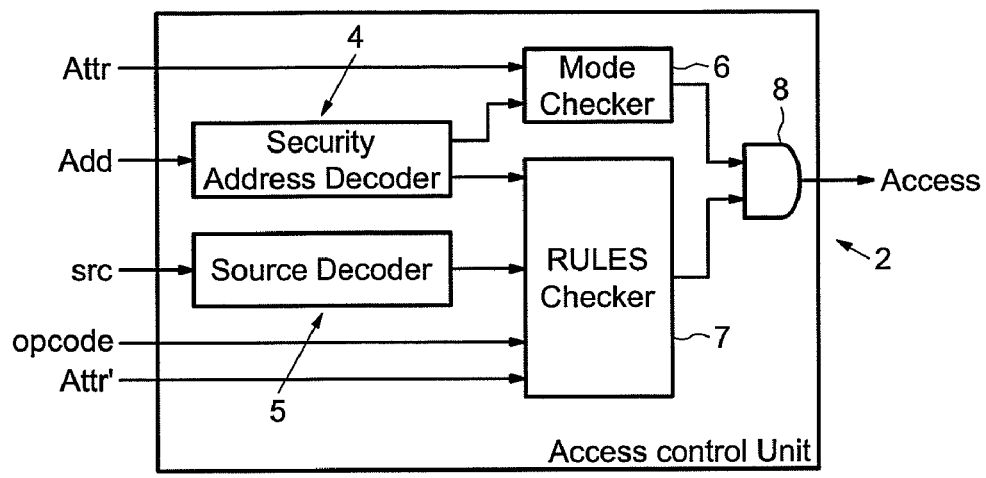
FIG. 3 illustrates the general structure of the access control unit.

Reference is now made to FIG. 3 which illustrates the general structure of the access control unit 2. As shown, the access control unit 2 comprises: a security address decoder 4, receiving requested address data Add and used to control that the address specified in the transaction request corresponds to a secured memory area; a source decoder 5 receiving source data Src, and used to identify the initiator of the request and to control that the initiator of the request is authorized to access the requested address; a mode checker 6 connected to the security address decoder and receiving attribute data Attr and further intended to verify the compatibility of the possible uses of the requested memory zone with protection bits specified in the attribute data Attr; and a security access controller 7 connected to the output of the security address decoder 4 and of the source decoder 5, and used to check that the transaction is compatible with filtering rules specified therein. It receives, in input, an operation code ("opcode")

and an attribute field Attr' intended to indicate whether the transaction concerns data or instructions.

An AND gate is in addition provided to realize a logical operation AND between the output of the security access controller 7 and that of the mode checker 6 to generate an access authorization signal "access" for the selector 3 (FIG. 2).

Figure 4:
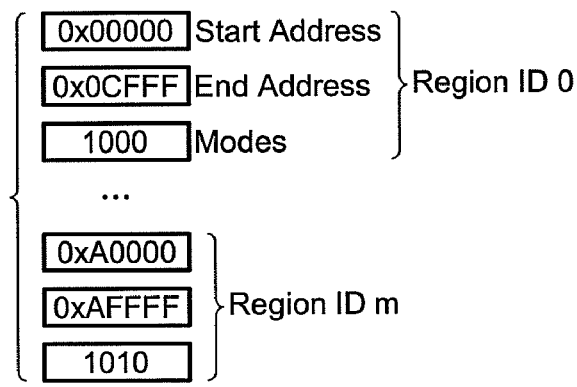
FIG. 4 illustrates the security address decoder arrangement.

Referring now to FIG. 4, a protected memory zone is divided into memory regions, for example eight different memory regions, each denoted by an identifier RegionID 0 . . . , RegionID m. Each memory region is identified by a starting address, an ending address and is associated with global access modality data for that region indicating the possible uses of the region.

The security address decoder 4 has the role to select the proper memory region associated to the requested address and the related mode of access.

The output of this module 4 is a pointer to the memory region matching the address and the related modes of access.

It should be noted that if an address matches more than one memory region, the region considered as having the highest priority must be selected. If there is no match between the requested address and the regions, and if the source decoder provides a positive answer, the access is allowed with no additional check.

Figure 5:
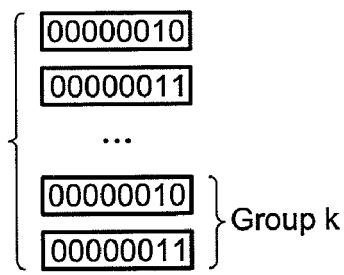
FIG. 5 illustrates the request source decoder arrangement.

Referring now to FIG. 5, and as indicated above, the source decoder has to select a group of sources in which the transaction initiator is present. For example, each group can contain up to two sources.

As concerns the mode checker 6, this component is intended to check that the access modality data associated with the requested region is compatible with the rights for the initiator. In particular, and for example, four bits expressing a global access permission are associated to each protected memory region.

The mode checker checks the compatibility of the global access modality data with the protection bits specified by the attribute field Attr. If there is no matching among signals, the access is denied.

It should be noted that the security address decoder 4 and the source decoder 5 are each constituted by a register.

The mode checker 6 is based on a comparator to provide comparison between the attribute filed and the access modality data output from the security address decoder 4.

The security access controller 7 is also based on the use of a register.

As indicated above, the aim of this component is to filter the requests and to check the security rules.

The security address decoder 4 provides the security access controller 7 with data indicating the requested memory region, whereas the source decoder 5 provides the security access controller 7 with data indicating the group of sources corresponding to the request initiator.

Figure 6:
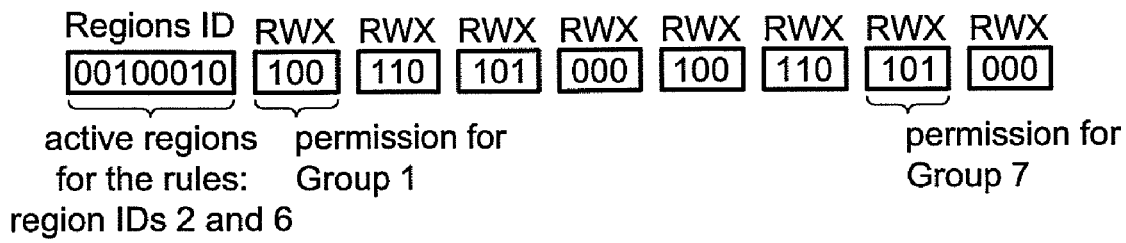
FIG. 6 shows an example of security rules.
Figure 7:
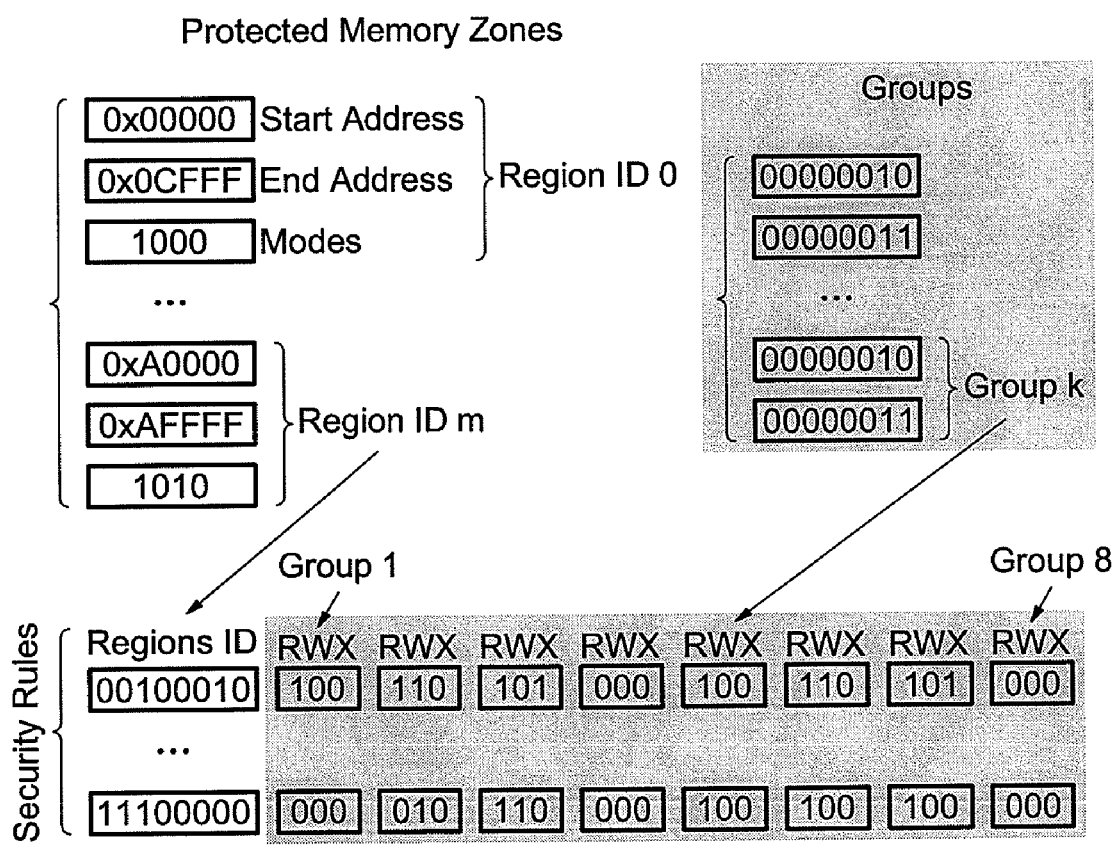
FIG. 7 illustrates the working of the security access controller.

Referring now to FIG. 6, the security access controller 7 comprises memory means in which are stored security rules.

The security rules comprise access right data for each group of transaction source, said access right data being associated with memory region data indicating the region in which the access right data of the security rules are valid.

Each security rule comprises a first field "Regions ID" indicating the active regions for the rules, and a second field consisting in a series of permissions for each source group.

In the illustrated example, active regions 2 and 6 are active for the rules. Each permission comprises a word RWX indicating the access right for the corresponding group.

Each word is used to code the read, write, and execution rights. For example, as illustrated in FIG. 6, group 1 is only allowed to write data, whereas group 7 is allowed to write and to execute an operation at the requested address.

This means that, for example, group 1 as a read-only permission on memory regions 2 and 6. If a source belonging to group 1 tries to perform a store operation either on region 2 or on region 6, the access will be denied.

In view of the foregoing, for controlling security of a transaction, following an input request emitted by a transaction source, data corresponding to a memory region together with access modality data are retrieved from the security address decoder and the source group corresponding to the transaction source is identified from the source decoder 5. Security access controller 7 controls, from the security rules stored therein, that the source has the proper access rights and that the memory region corresponding to the requested address is valid for the rules.

As indicated above, the mode checker 6 checks, in addition, that the access modality data associated with the selected region is compatible with the protection bits specified by attribute field Attr.

The AND gate 8 thus realizes a logical-and operation between the output of the security access controller 7 and that of the mode checker 6 to check that the source has the proper access rights for the requested address and for the requested operation, and that the global access modality data associated with the requested memory region is compatible with the protection bits specified by the attribute field Attr.

If it is the case, the access signal "access" is transmitted to the selector 3 to allow packet forwarding through the network up to the destination address.

It should be noted that a further check can be carried out concerning the memory regions size, and the operation intended to be executed.

In particular, if the operation size is greater than the memory region size, the access will be denied.

Figure 8:
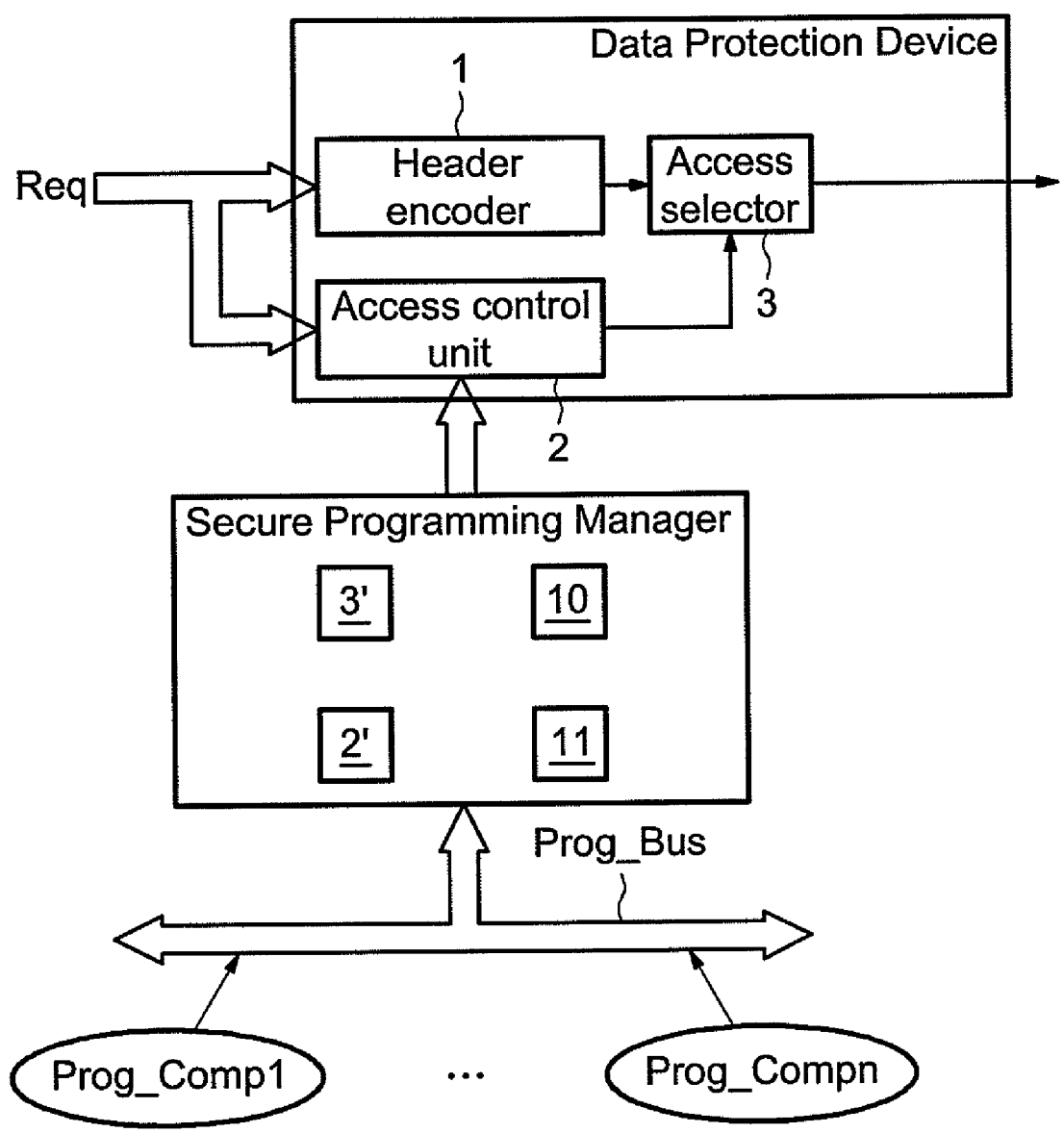
FIG. 8 illustrates a data protection device with its programming interface and associated with a secure programming manager.

Referring to FIG. 8, it should also be noted that the above disclosed data protection device also applies to global secure programming manager systems for controlling access to a network in an integrated circuit, namely to a NoC, through a network interface, and in particular, to provide security against unauthorized programming requests.

As a matter of fact, the network interface, and in particular the data protection device is fully reprogrammable. The access control unit, and in particular the information stored in the register can be reprogrammed from outside programming components, such as Prog_Comp 1, . . . , Prog_Comp n, through a programming bus Prog_Bus. In other words, the access control unit constitutes a reprogrammable device according to the using context, using input ports of the network interface used to access the registers of the access control unit.

FIG. 8 shows the secure programming manager which allows safe re-programming at run-time all the registers of the network interface and in particular the access control unit related registers.

The data protection device can thus be used to secure the Network-On-Chip system against any non-authorized programming requests.

Such a secure programming manager system is based on the use of an above described data protection device. It thus comprises an access control unit 2' associated with a selector 3' similar to the corresponding components previously disclosed.

However, the data protection device is, in this case, completed with means 10 for generating a first reply signal, in response to a programming request, and to emit such a reply signal to the transaction initiator.

Means 11 are also provided for controlling receipt of an acknowledged signal from the request initiator within a predetermined time limit, associated with a timeout generator.

For example, the first signal is a random signal. In such a case, the secure programming manager is provided with a random signal generator.

In another embodiment, the first signal is formed by a cryptographic signal. The secure programming manager is thus, in this case, provided with a cryptographic signal generator.

The working out of the secure programming manager system is similar to the data protection device previously disclosed.

In other words, it is checked whether the access rules authorize a programming access and whether the request initiator is authorized for a reprogramming.

In addition, as mentioned above, a further security is provided by a double acknowledge procedure.

For each reprogramming request, the secure programming manager sends a reply signal to the request initiator and checks whether an acknowledge signal is received within the predetermined time limit. In addition the reply signal must contain an elaboration of the previously generated random signal.

In another embodiment the reply signal must contain an elaboration of the previously generated cryptographic signal.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A data protection device for an interconnection network on chip, comprising:
   a header encoder configured to receive an input request and generate from the input request a network packet for routing to a destination address on the chip; and
   an access control unit configured to receive said input request and determine whether the input request is compatible with a set of security access rules, said access control unit further configured to issue an authorization for controlling access to said interconnection network on chip as a function of whether the destination address is in a secured memory area and whether a source of said input request is authorized to access the destination address; and
   an access selector configured to block forwarding of the network packet from the header encoder in the absence of an authorization issued by the access control unit.

2. The data protection device according to claim 1, wherein the access control unit comprises a security address decoder configured to determine whether the destination address corresponds to the secured memory area.

3. The data protection device according to claim 1, wherein said access control unit comprises a request source decoder configured to determine whether the source of the input request is authorized to access the destination address.

4. A data protection device for an interconnection network on chip, comprising:
   a header encoder configured to receive an input request and generate a network packet for routing the input request to a destination address on the chip; and
   an access control unit configured to allow access to said destination address, said access control unit comprising
   a memory configured to store access rules for controlling access to said interconnection network on chip as a function of the destination address and of a source of said input request;
   wherein the access control unit comprises a security address decoder comprising a memory configured to store a set of memory regions each associated with global access modality data
   wherein said access control unit comprises a request source decoder comprising a memory configured to store a set of groups of transaction sources comprising processor threads or sub-processes; and
   wherein said access control unit comprises a memory configured to store access right data for each group of transaction sources, each access right data being associated with memory region data indicating the regions in which the access right data are valid.

5. The data protection device according to claim 4, further comprising a mode checker configured to control matching between the global access modality data for one selected memory region with access modality provided in said request.

6. The data protection device according to claim 4, further comprising an encoder configured to encode a packet header to route the input request to the destination under the control of said access control unit.

7. The data protection device according to claim 1, further comprising: a secure programming manager system for controlling programming access to said interconnection network through a programming port, comprising:
   an access control unit which allows programming access at a destination address, said access control unit comprising a memory storing access rules for controlling programming access to said network as a function of the destination address and of a source of a programming request.

8. The data protection device according to claim 7, further comprising means for generating a first reply signal to the source of the programming request and means for controlling receipt of a second reply signal from the source of the programming request within a time limit.

9. The data protection device according to claim 8, wherein the first signal is a random signal.

10. The data protection device according to claim 8, wherein the first signal is a cryptographic signal.

11. A process for controlling access to an interconnection network in an integrated circuit, comprising:
   receiving an input request from at least one transaction source, said request containing at least a requested address data and a transaction source data;
   determining whether the input request is compatible with a set of security access rules;
   issuing an authorization for controlling access to said interconnection network as a function of whether said requested address data is an address in a secured memory area and whether said transaction source data is a source authorized to access the address in the secured memory area; and
   blocking access to said interconnection network in the absence of the issued authorization.

12. The process according to claim 11, further comprising determining whether the address of said requested address data corresponds to the secured memory area.

13. The process according to claim 11, further comprising identifying a group of transaction sources corresponding to said transaction source data.

14. The process according to claim 13, further comprising obtaining access right data corresponding to said group of transaction sources and checking whether the access right data are valid for said secured memory area region.

15. The process according to claim 11, further comprising controlling matching between a global access modality associated with the requested address data and an access modality provided in said input request.

16. The process according to claim 15, further comprising controlling whether the requested address size exceeds the size of said secured memory area.

17. A data protection device for an interconnection network on chip, comprising:
  an access control unit at a network interface positioned between a network on chip and a communication element on chip configured to initiate a request to access the network on chip, that request being received by the network interface, and the access control unit comprising:
    a security address decoder configured to determine whether a destination address of the received request falls within a certain protected memory zone, and if so output data indicative of the certain protected memory zone and of possible uses of the certain protected memory zone;
    a mode checker configured to determine whether attribute data associated with the received request matches the data indicative of possible uses of the certain protected memory zone and generate a first signal indicative thereof;
    a source decoder configured to determine a source of the received request;
    a rule checker responsive to the identified source and the certain protected memory zone and configured to determine whether the source is permitted to access the protected memory zone and generate a second signal indicative thereof; and
    a circuit configured to combine the first and second signals to generate a control signal indicative of permission for the received request to access the network on chip.

18. A data protection device for an interconnection network on chip, comprising:
  an access control unit at a network interface positioned between a network on chip and a communication element on chip configured to initiate a request to access the network on chip, that request being received by the network interface, the access control unit configured to:
    check whether a destination address specified in the request is falls within a certain protected memory zone;
    check whether a source of the request is authorized to access the network on chip in the certain protected memory zone; and
    check whether a requested operation associated with the request is permitted for certain protected memory zone;
  wherein the access control unit comprises, for checking whether a destination address specified in the request is falls within a certain protected memory zone, a security address decoder configured to determine whether a destination address of the received request falls within a certain protected memory zone, and if so output data indicative of the certain protected memory zone.

19. A data protection device of for an interconnection network on chip, comprising:
  an access control unit at a network interface positioned between a network on chip and a communication element on chip configured to initiate a request to access the network on chip, that request being received by the network interface, the access control unit configured to:
    check whether a destination address specified in the request is falls within a certain protected memory zone;
    check whether a source of the request is authorized to access the network on chip in the certain protected memory zone; and
    check whether a requested operation associated with the request is permitted for certain protected memory zone;
  wherein the access control unit comprises, for checking whether source of the request is authorized to access the network on chip in the certain protected memory zone:
    a source decoder configured to determine a source of the received request; and
    a rule checker responsive to the identified source and an identification of a certain protected memory zone addressed by the request configured to determine whether the source is permitted to access the protected memory zone.

20. A data protection device for an interconnection network on chip, comprising:
  an access control unit at a network interface positioned between a network on chip and a communication element on chip configured to initiate a request to access the network on chip, that request being received by the network interface, the access control unit configured to:
    check whether a destination address specified in the request is falls within a certain protected memory zone;
    check whether a source of the request is authorized to access the network on chip in the certain protected memory zone; and
    check whether a requested operation associated with the request is permitted for certain protected memory zone;
  wherein the access control unit comprises, for checking whether requested operation associated with the request is permitted for certain protected memory zone:
    a security address decoder configured to determine whether a destination address of the received request falls within a certain protected memory zone, and if so output data indicative of possible uses of the certain protected memory zone; and
    a mode checker configured to determined whether attribute data associated with the received request matches the data indicative of possible uses of the certain protected memory zone.

21. A data protection device for an interconnection network on chip, comprising:
  an access control unit at a network interface positioned between a network on chip and a communication element on chip configured to initiate a request to access the network on chip, that request being received by the network interface, the access control unit configured to:
    check whether a destination address specified in the request is falls within a certain protected memory zone;
    check whether a source of the request is authorized to access the network on chip in the certain protected memory zone;

check whether a requested operation associated with the request is permitted for certain protected memory zone; and grant permission for the received request to access the network on chip subject to satisfaction of each check;

wherein the access control unit comprises, for granting permission, logic circuitry configured to combine a first and second signal, wherein:

the first signal is indicative of the destination address specified in the request falling within a certain protected memory zone and the requested operation associated with the request being permitted for the certain protected memory zone; and the second signal is indicative of source of the request being authorized to access the network on chip in the certain protected memory zone.

* * * * *